(12) United States Patent
Schulze et al.

(10) Patent No.: US 6,485,674 B2
(45) Date of Patent: Nov. 26, 2002

(54) DEVICE FOR PRODUCING SOFT SOLDER

(76) Inventors: Jürgen Schulze, Semmelweissstrasse 29, D-14482 Potsdam (DE); Walter Protsch, Patrizierweg 76, D-14480 Potsdam (DE)

( * ) Notice: Subject to any disclaimer, the term of this patent is extended or adjusted under 35 U.S.C. 154(b) by 0 days.

(21) Appl. No.: 09/829,821

(22) Filed: Apr. 10, 2001

(65) Prior Publication Data

US 2002/0109273 A1 Aug. 15, 2002

Related U.S. Application Data

(62) Division of application No. 09/485,917, filed as application No. PCT/DE99/01901 on Jun. 25, 1999, now Pat. No. 6,290,745.

(30) Foreign Application Priority Data

Jun. 29, 1998 (DE) .......................... 198 30 057

(51) Int. Cl.[7] .................................................. B22F 9/08
(52) U.S. Cl. ...................... 266/202; 266/235; 222/593
(58) Field of Search ........................ 266/202, 227, 266/235; 222/593

(56) References Cited

U.S. PATENT DOCUMENTS

| | | | | |
|---|---|---|---|---|
| 5,229,016 A | * | 7/1993 | Hayes et al. | 222/593 |
| 5,294,245 A | * | 3/1994 | Gilbert et al. | 266/235 |
| 5,302,182 A | * | 4/1994 | Gorynin et al. | 75/334 |
| 6,290,745 B1 | * | 9/2001 | Schulze et al. | 75/335 |

FOREIGN PATENT DOCUMENTS

| | | | | |
|---|---|---|---|---|
| JP | 02-118003 | * | 5/1990 | 75/335 |

* cited by examiner

Primary Examiner—George Wyszomierski
(74) Attorney, Agent, or Firm—Herbert Dubno (57) ABSTRACT

Soft solder powder is made in the form of spherical fine metal particles having a grain size ranging from 1 to 100 μm and a Liquidus temperature <250° C., using the following method steps:

a) gravity feeding the melted solder into another oil receiver while setting a volume ratio of oil to melted solder to at least 10:1;

b) dispersing the liquefied solder by agitating and by a subsequent shearing off in consecutive shearing steps according to the rotor/stator principle at rotational speeds ranging from 1500 to 5000 rpm while adding oil from the receiver of step a);

c) circulating the solder/oil mixture of step b) at least twenty times in a circuit contrary to the direction of flow above the oil receiver of step a) and in the shearing off steps;

d) outward transferring of the solder/oil mixture from the circuit of step c) into another oil receiver for separating off the dispersed material by sedimentation and returning the oil to the receiver of step b) and/or a); and e) extracting and feeding the dispersed material of step d) for a subsequent washing.

19 Claims, 6 Drawing Sheets

DEVICE FOR PRODUCING SOFT SOLDER

CROSS REFERENCE TO RELATED APPLICATION

This application division of Ser. No. 09/485,917 filed Feb. 16, 2000 now U.S. Pat. No. 6,290,745 and is a national stage of PCT/DE99/01901 filed Jun. 25 1999 and based upon German national application 198 30 057.3 of Jun. 29 1998 under the International Convention.

FIELD OF THE INVENTION

The invention relates to a device for the pressure-less production of soft solder powder, in particular exactly spherical fine metal particles in a grain size range of 1 to 100 $\mu$m and with a liquidus temperature <250° C. from a body of solder, with a heatable receiver for melting the solder in the oil stable at high temperatures.

BACKGROUND OF THE INVENTION

It is known to produce soft solder powder by subjecting a solder melt to flow dispersion in liquids in rapidly rotating agitators. So for instance D 237 575 A3 describes a method for producing solder paste, whereby a solder carrier consisting of colophonium, and organic solvent, a compound with reducing action and triethanolamine is mixed with solder metal. In a receiver which can be selectively cooled or heated with an agitator the solder carrier is produced at 50° C. by stirring. The solder metal is added in compact form to the receiver, while heating the latter to a temperature which exceeds the melting point of the solder metal by approximately 10° C. and the melted mass is dispersed by being agitated at a high speed of approximately 10000 rpm. After that it is cooled down to approximately 20° C. below the melting point of the solder metal and the agitator is operated at a lower speed until it is cooled to room temperature. This known process has the disadvantage that the obtained particle size of approximately 150 $\mu$m is not a fine metal powder. The dispersed solder particles have also different diameters, i.e. they have by far a too broad grain distribution range. Therefore the known method has not proven itself on a large industrial scale, especially because it does not work continuously.

It is also known to use shearing devices working according to the rotor/stator principle for the production of emulsions (liquid/liquid) and suspensions (solid/liquid) (see IKA Maschinenbau-Prospekt "Dispergieren", pages 22–24, 1997). These devices are used for lacquers, dyes, pharmaceutical products, metal oxide suspensions and coatings. According to this known principle, as a rule, it has to be insured that in the case of highly viscous media the media flow has to be sustained by conveyor units.

Furthermore from DE 44 02 042 A1 a process is known for producing microparticulate reflow-solder agents, whose solder metal content is present in a small grain size range. The compact solder metal is melted into an organic liquid which can be heated to high temperature, such as castor oil, and by means of a flow dispersion process, brought to a spherical symmetrical grain size range of preferably 3 to 10 $\mu$m in diameter. The organic liquid is then removed to the extent that the metal particulate remains covered, so that it can be introduced in an emulsion and the individual particles of the suspension and emulsion are covered according to the method of complex coacervation with a melamine polymerisate within the layer thickness range of 50 to 250 nm. The microparticulate organic phase is then quantitatively separated from the microparticulated metal phase. This microparticulate metal powders are protected by a duroplastic polymer system, however they can be released again only through the action of a highly activated fluxing agent. These fluxing agents lead to the destruction of the microelectronic switching circuits and are therefore unsuitable. Besides this method has been used only in laboratories and is not capable of insuring a uniform sphere diameter from charge to charge.

Another known solution (U.S. Pat. No. 4 648 820) melts metal such as aluminum in a crucible, feeds the molten metal to a cooling chamber filled with cooling fluid, and disperses the liquid metal by means of spinning disks in drops, which again are drawn together with the cooling fluid into a recirculation cycle and in a separator are separated from the cooling fluid, whereby the latter is returned to the cooling chamber.

According to U.S. Pat. No. 5 411 602 the solder is melted and the molten solder is divided into drops by means of inert gas. This state of the art is also plagued by the drawback that the produced metal particles do not have uniform sphere diameters, so that in any case sorting processes are necessary in order to select metal particles of an approximately equal size having the same sphere diameter. That renders this known solution inefficient.

OBJECT OF THE INVENTION

It is the object of the invention to improve a device of the kind mentioned at the outset, so that the metal powders produced according to the flow dispersion principle have a narrow grain size range clearly below 100 $\mu$m, a precise spherical shape with an almost constant diameter, by avoiding any screening and at low cost in a quasi-continuous process.

SUMMARY OF THE INVENTION

This object is achieved with the following steps
a) gravity feeding the molten solder in a further oil receiver by setting a volume ratio of oil and solder melt of at least 10:1,
b) dispersion of the liquefied solder by agitating and subsequent shearing in successive shearing steps according to the rotor/stator principle at speeds of 1500 to 5000 rpm with the addition of oil from the receiver of step a),
c) circulating by at least 20 times of the solder/oil mixture of step b) in a counterflow over the oil receiver of step a) and the shearing steps, whereby through the control of the shearing speed the number of the steps and the geometry of the rotor, the particle size and particle distribution of the dispersed material in the dispersant are set,
d) discharging the solder/oil mixture from the circuit of step c) into a further oil receiver for the separation of the dispersed material through sedimentation and returning the oil to the receiver of step b) and/or a) and
e) extracting and feeding the dispersed material of step d) for subsequent cleaning.

According to a further preferred feature of the method of the invention, vegetable or animal oils, preferably castor oil, are used as oils.

It has surprisingly been found that solder melts with an extremely high viscosity at a density rate between the dispersed material and the dispersant of ≧2.5 can be separated with a shearing device without jamming the rotors in the stators and without requiring further conveying aggregates. Therefore in a further preferred embodiment of the method of the invention, the solder/oil mixture flows through the consecutive shearing steps in the direction of gravity. The solder/oil mixture is pressed by gravity into the inlet of the first shearing step, where it enters the inner space of the first rotor and reaches the crenelated shearing openings of the first rotor, flows through the slots of the stators surrounding the first rotor and is thereby radially forced into the inlet space of the second shearing step. Through the slots of the second rotor and stator, the solder/oil mixture reaches the third shearing step. By moving the rotor slots past the stator slots, due to the high peripheral speeds very high shearing forces are created, which separate the solder enveloped by the oil. Depending on the number and breadth of the slot openings in the individual shearing steps, the speed and the geometry of the rotors, it is possible to control the size of the solder particles at selected temperatures. Due to the high shearing forces the special advantage persists that the solder/oil mixture is conveyed to the circuit of step c). After a circulation of at least 20 times, and consequently repeated shearing, particles of clearly less than 100 $\mu$m are obtained.

In a further preferred embodiment of the method of the invention, the process temperature in steps b) and c) is set at approximately a maximum of 30° C. above the liquidus temperature of the solder and the oil temperature of step d) at approximately 90 to 130° C. through the heat-carrying medium.

In case the density ratio of the dispersed material to the dispersant is higher than $\geqq 2.5$, the solder/oil mixture is additionally agitated.

A further preferred embodiment of the method of the invention provides that the individual steps be supplied by separate heating/cooling circuits. Of course when several steps are combined, it is part of the method of the invention to have one common heating/cooling circuit serving each. It is also conceivable to use only a single heating/cooling circuit.

In a further preferred embodiment of the method of the invention, for the extraction of the dispersed material of step e) a solvent is added, forming a suspension through agitation, which is pumped to a not represented cleaning installation for washing. As a solvent for step e), fat-dissolving solvents, preferably acetone, have proven to be particularly suitable. The extraction of the dispersed material according to step e) can also be accomplished through gravity collection.

Further more the object of the invention is attained with a device wherein in a compact module the melt container for the massive solder and a dispersion container for the dispersion of the solder melt in oil are arranged in cascade to each other and a sedimentation tank for the separation of the dispersed solder material from oil is arranged underneath the dispersion container, and that the containers are interconnected by pipe conduits, whereby within the compact module the melt container is located above the dispersion container and that to the dispersion container a multiple step shearing device is assigned for the separation of the solder melt into drops, whereby the feeding pipe from the melt container to the dispersion container is connected to the dispersion container by an inclined pipe segment in the manner of an injector leading to the container bottom area, at whose lowest point a connection piece with a flange is provided for connecting the shearing device, whose outlet is flanged to the recirculation conduit returning to the upper part of the dispersion container, which via a branched-off segment ends in the sedimentation container, which in turn is connected via an ascending pipe with the upper part of the dispersion container via a pump with drain-off pipes, and that all containers, pipe conduits, the shearing device and pump can be heated or cooled by at least one tempering device.

According to a further feature of the device of the invention, all containers and pipe conduits are built as double-walled bodies of stainless steel, preferably V2A, whose intermediate spaces formed by inner and outer walls are acted upon from the tempering device with a high-temperature heat carrier oil.

A further preferred embodiment of the device of the invention provides that the dispersion container is incorporated in a separate heating/cooling circuit, and the pump, the ascending pipe and drain-off pipe are incorporated in a further separate heating/cooling circuit, the shearing device and recirculation pipe conduit again in a separate heating/cooling circuit and additionally in a cooling circuit with a cooling container, the sedimentation container with the branched-off pipe in a separate heating/cooling circuit, whereby flexible, heat-stable metal hoses constitute the respective connecting pipe conduits and are respectively connected to a common distributor, which is connected with the tempering device through a flow line and a return line.

However it is also possible to incorporate all containers, pipe conduits, setting members, connection pieces, flanges and the shearing device in a common heating/cooling circuit, without leaving the framework of the invention. An electric heating device can be used instead of an oil heating device.

In a further suitable development of the device of the invention, the pipe conduits and the connection piece are provided with locking elements, preferably ball valves made of stainless steel.

In a particularly advantageous further development of the device of the invention, the shearing device consists of several, preferably three, rotors arranged corotationally on a drive shaft, which have teeth spaced apart by slots, whereby the rotors are inserted into a stator separating the shearing steps from each other and insured against rotation, which has teeth spaced apart by slots, whereby during the rotation of the rotor, the slots in the rotor and stator clear passage openings for the passage of the solder/oil mixture into the subsequent shearing step.

In a further preferred embodiment of the device of the invention, the teeth of the rotor and stator form circles of teeth, which are arranged concentrically with respect to each other and fitted into each other.

According to a further preferred feature of the device of the invention, the shearing device is arranged in vertical position in alignment with the axis of the dispersion container, whereby the solder/oil mixture is independently sucked axially into the inlet of the shearing device and pressed radially through the slots of the rotor-stator arrangement.

At greater density differences between dispersed material and dispersant, particularly at a ratio $\geqq 2.5$, the dispersion container is suitably provided with an agitator.

In the sedimentation container there is an insert with a collection basket for the collection and separation of the solder particles from the process. The collection basket is located close to the bottom of the sedimentation container, so that by gravity the solder particles drop into the collection basket, which can then later be removed from the sedimentation container.

According to a further preferred feature, instead of the drain-off pipe and the collection basket an agitator leading through the container cover of the sedimentation container and a height-adjustable dip pipe which reaches down with one end close to the container bottom of the sedimentation container, and is connected at the other end to a pump with variable direction of rotation for aspiring the suspended dispersed material, respectively for feeding the solvent into the container, can be provided.

In order to maintain the process temperature by at least 30° C. above the liquidus temperature, in all containers and pipe conduits temperature sensors are provided close to the solder. This insures that the viscosity of the solder melt will remain approximately the same in all stages.

In a further preferred embodiment of the device of the invention, the compact module consists of a housing frame with a bottom plate, wherein table-like support stands for the preliminary assembly of the containers, pipe conduits, distributor and the pump are provided.

According to a further feature, the shearing device is received by an insert movable on the bottom plate and held tension-free on the flange of the ball valve and the flange of the recirculation conduit. This insures that the shearing device can be dismounted without difficulty, changed and mounted again.

All containers, pipe conduits, flow and return lines, locking members, distributor and pump are heat-insulated, in order to keep the heat losses through radiation at a minimum.

Furthermore according to a preferred feature of the device of the invention, the housing frame of the compact module is provided with wall plates whose inner sides have heat and sound insulating plates or mats coated with aluminum foil.

In a further preferred embodiment of the device of the invention, the containers, pipe conduits, flow and return lines locking members, the pump, shearing device, the metal hoses and the distributor are heat-insulated.

In a further preferred embodiment of the device of the invention, the tempering device is mobile and arranged outside the compact module. However the tempering device can be just as well arranged in the compact module.

The invention distinguishes itself over all heretofore-known flow dispersion processes in that the soft solder powder can be produced with exact spherical shape and within a narrow grain size range quasi-continuously on a large industrial scale. By simply exchanging the shearing device, by changing the slot dimensions, the variation of the number of shearing steps, the rotational speeds and the number of recirculations, the sphere diameters of the solder particles can be kept within a narrow grain size range, at low cost and with high precision. The device of the invention is of compact construction, user-friendly and requires little maintenance.

SPECIFIC DESCRIPTION

Figure 1:
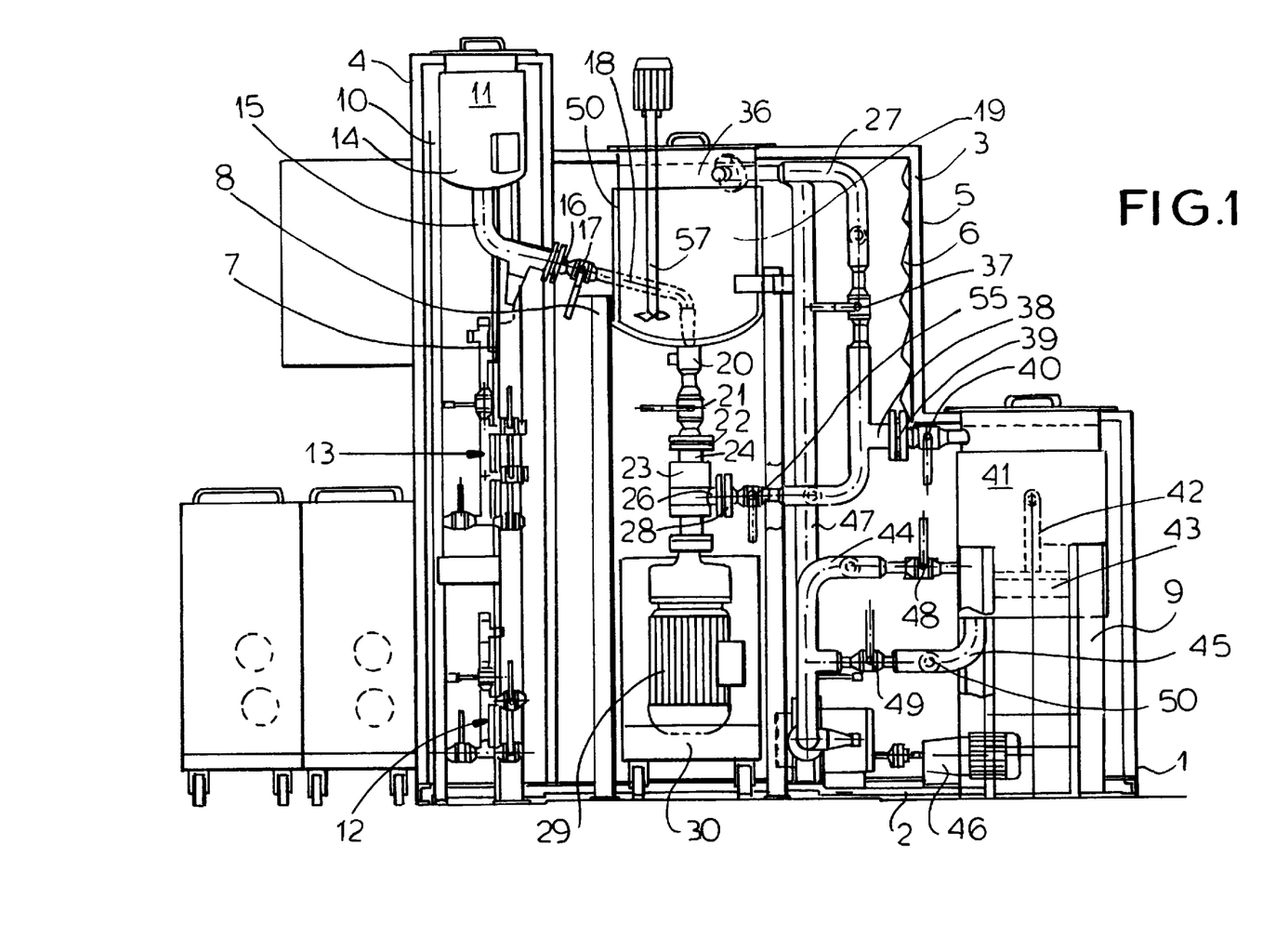
FIG. 1 is a diagrammatic elevational view of the device of the invention.

As can be seen in detail from FIG. 1, the device of the invention consists of a container-like compact module 1 having all essential components. The compact module 1 has a somewhat rectangular bottom plate 2, upon which vertical and horizontal struts 3 are connected to form a parallelepipedic housing frame 4. The struts 3 consist of angle sections made of steel or aluminum. All lateral surfaces and the cover surface of the parallelepipedic housing frame 4 are lined with wall plates 5, which on their insides are provided with heat and sound insulating plates 6, consisting of an appropriate sound-absorbing material coated with aluminum foil.

In the compact module 1 table-like support stands 7, 8 and 9 are inserted preassembled for the main components of the device of the invention.

The support stand 7, also made of angle sections, receives the melt container 11 at its upper area 10 of the cover area of the compact module 1. In the middle and lower area of the support stand there are heat distributors 12 and 13 for the supply of the individual components with the heating medium. The melt container 11 has a curved bottom 14, at whose lowest point a vertically engaging drain-off pipe 15 is connected. The drain-off pipe 15 is shaped as a 60° arc for the connection of a ball valve 17, by means of which the drain-off pipe 15 can be opened and closed.

The ball valve 17 continues on the outlet side with a conduit segment 18, which reaches injector-like into the bottom area of the dispersion container 19 at an angle of 60°. The dispersion container 19 is supported by the support stand 8 and is positioned so that it is located sufficiently deeper than the deepest point of the melt container 11, so that the solder melt can reach the dispersion container 19 due to gravity.

The dispersion container 19, just like the melt container 11, has a curved bottom area, where the solder melt collects. In the deepest point of the dispersion container 19 an outgoing connection piece 20 is provided in alignment with the container axis of the dispersion container 19, for the connection with a ball value 21 for opening and closing the connection piece 20. On the outgoing side the ball valve 21 is connected on a flange 22 to which the shearing device 23 is connected with its inlet flange 24 in vertical fitting position. The outlet 25 of the shearing device 23 is provided with an outlet flange 26, which is positioned perpendicularly with respect to the fitting position.

In addition the support stand 8 is provided with a recirculation conduit 27 with a pre-mounted flange 28 releasably connected with the connection flange 26 of the shearing device 23.

The shearing device 23 with its drive aggregate 29 is held by an insert movable on the bottom plate 2 in such a manner that the shearing device 23 can be screwed without tension to the flange 22 of the ball valve 21, respectively to the flange 28 of the recirculation conduit 27.

Figure 2:
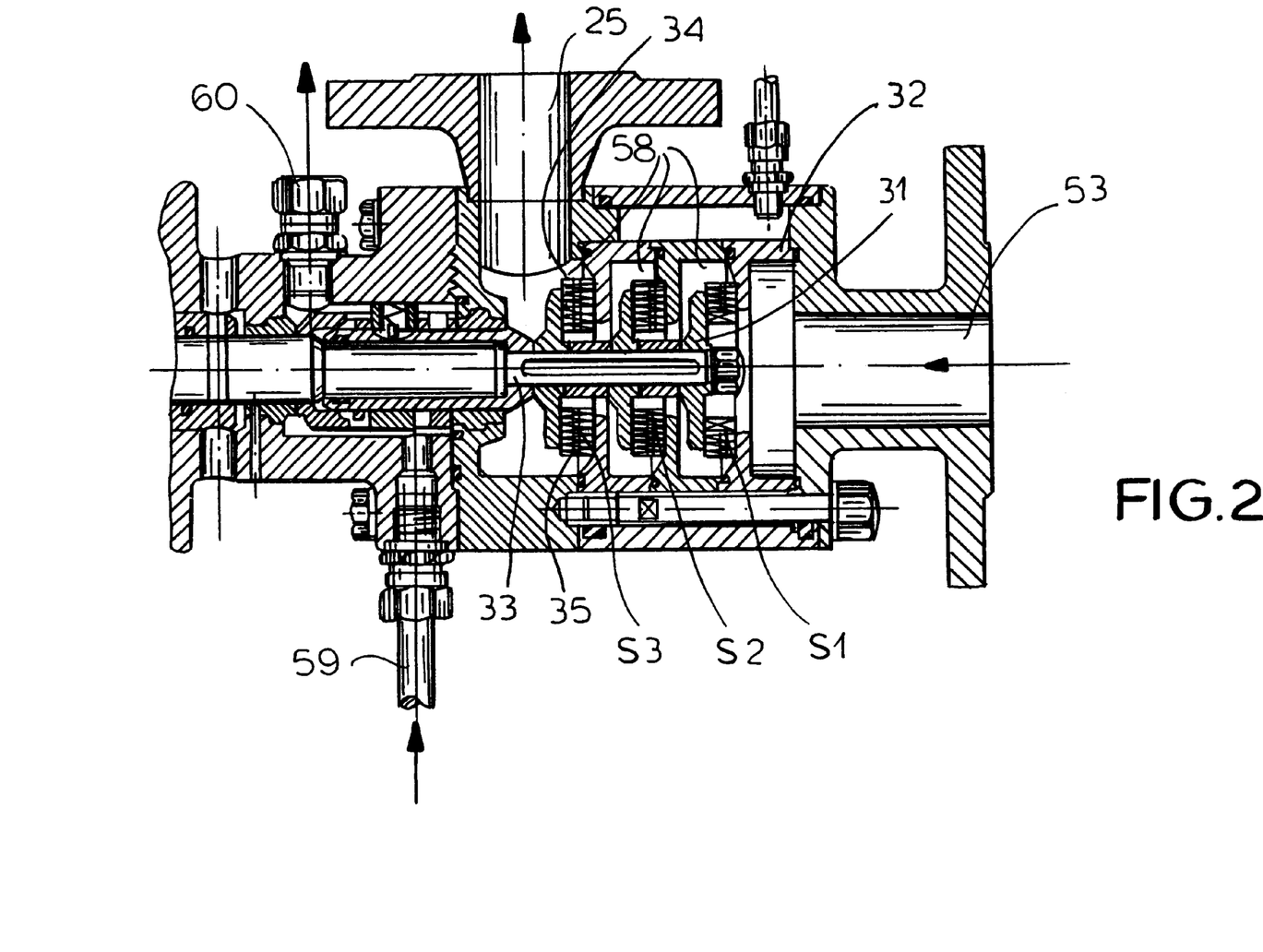
FIG. 2 is a cross sectional view of a three-step shearing device.

As shown in FIG. 2, the shearing device 23 consists of three shearing steps S1, S2 and S3 with six shearing spaces 58. Each shearing step is comprises a rotor 31 and a stator 32. The rotor sits corotationally on the drive shaft 33 of the shearing device 23, which is driven by the drive aggregate 29, for instance a motor. The rotor 31 rotates with the drive shaft 33 in the stator 32 with a speed of approximately 2500 rotations per minute and has teeth distributed coaxially with the shaft 33, which are spaced apart by slots 34. The stator 32 also has teeth spaced apart by slots. The teeth are arranged coaxially with respect to each other. The slots 34 and 35 lead into the second shearing step S2.

The second shearing step is built just like the first one, only that the number of teeth, and therewith the number of slots 34 in the stator 32 is bigger. Again the slots 34 in the stator 32 of the shearing step S2 lead into the space of the shearing step S3.

According to FIG. 1, the recirculation conduit 27 leads back into the upper area of the dispersion container 19, whereby this conduit ends above the liquid level of the filling medium in the dispersion container 19 and can be opened and closed by a ball valve 37 located approximately at the level of the container bottom. Approximately underneath this ball valve 37, the recirculation conduit 27 has a horizontally running branched-off conduit 38 with flange 39, on which a ball valve 40 is flanged, which on the outgoing side engages in the upper area of a sedimentation container 41.

This sedimentation container 41 is located clearly underneath the dispersion container 19 and is received by the support stand 9, which is connected with the frame of the support stand 8. In the sedimentation container 41, at the bottom side an insert 42 with a collection basket 43 is inserted. Two outlet conduits 44 and 45 lead to the bottom area of the sedimentation container 41 via a rotary piston pump 46 into an ascending conduit 47 fastened in the frame of the support stand 8, which is returned to the upper area of the dispersion container 19 above the surface level of the filling medium. In the outlet conduits 44 and 45 ball valves 48 and 49 are integrated, for opening and closing the conduits.

Figure 3:
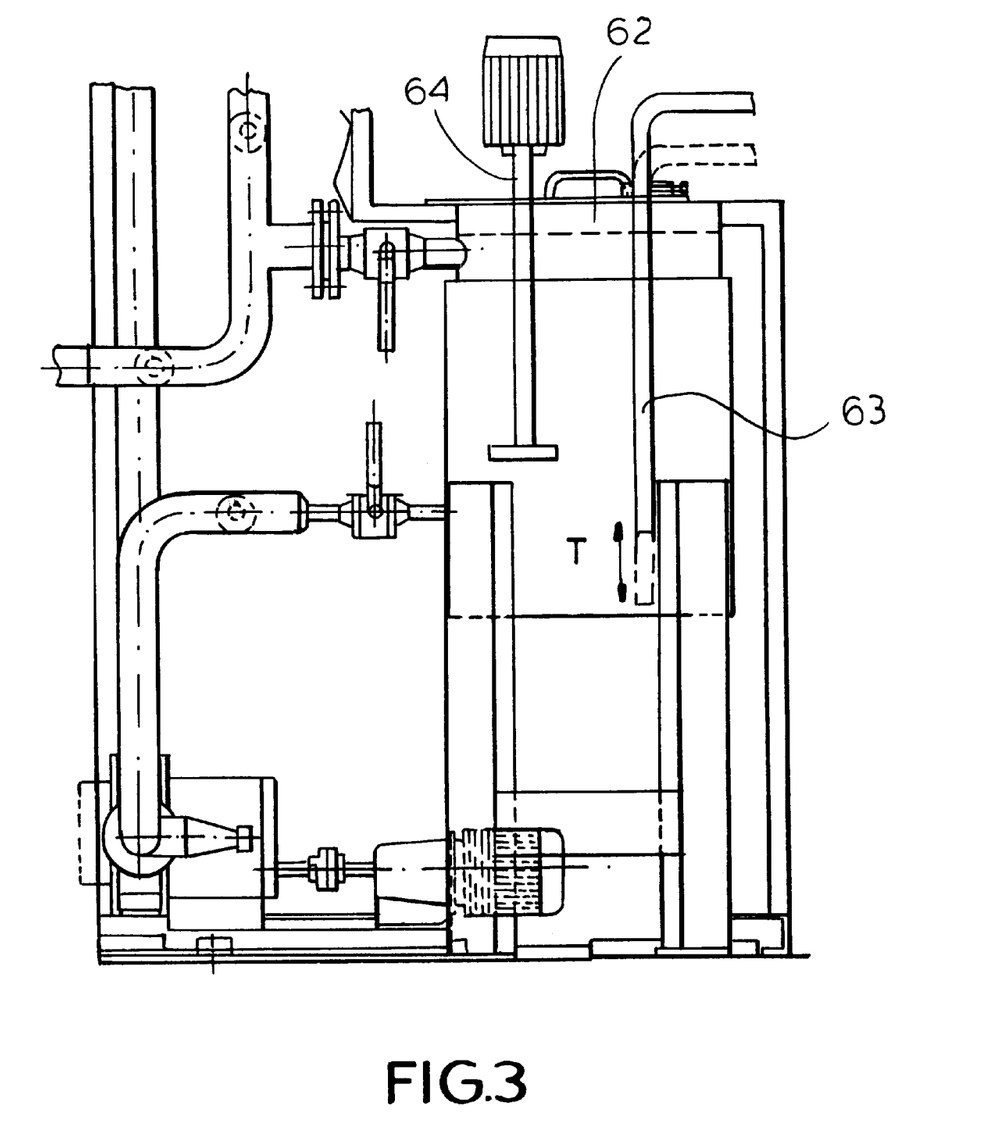
FIG. 3 is a view similar to FIG. 1 showing a variant of the sedimentation container for the removal of the dispersed material.

Instead of the collection basket 43 and instead of the outlet conduit 45, as shown in FIG. 3, an agitator 64 and a dip pipe 63 can be provided. The agitator 64 passes through the container cover 62 of the sedimentation container 41 and reaches close to the level at which the horizontal branched-off pipe 38 enters the container 41. The dip pipe 63 also passes through container cover 62 and is height-adjustably fastened to it, so that the dipping depth T of the dip pipe 63 in the sedimentation container 41 is variable. The end of the dip pipe 63 which projects from the container cover is connected with a pump with variable rotation direction not shown in the drawing, so that by means of this dip pipe solder material dispersed in the solvent are aspired, respectively solvent can be pumped into the sedimentation container 41. By means of the agitator 64, the dispersed solder sinking due to gravity and the solvent are converted into a suspension.

Naturally, there is no need for specially mentioning that the outlet conduit 45 can remain mounted, when the dispersed solder material is aspired for being fed to a cleaning installation not shown in the drawing. The containers 11, 19, 41, the pipe conduits 15, 18, 27, 38, 44 45, 47 and 63, the heat distributors 12 and 13, the ball valves 17, 21, 37, 40, 48 and 49 are enveloped with a heat insulation not shown in the drawing.

Figure 4:
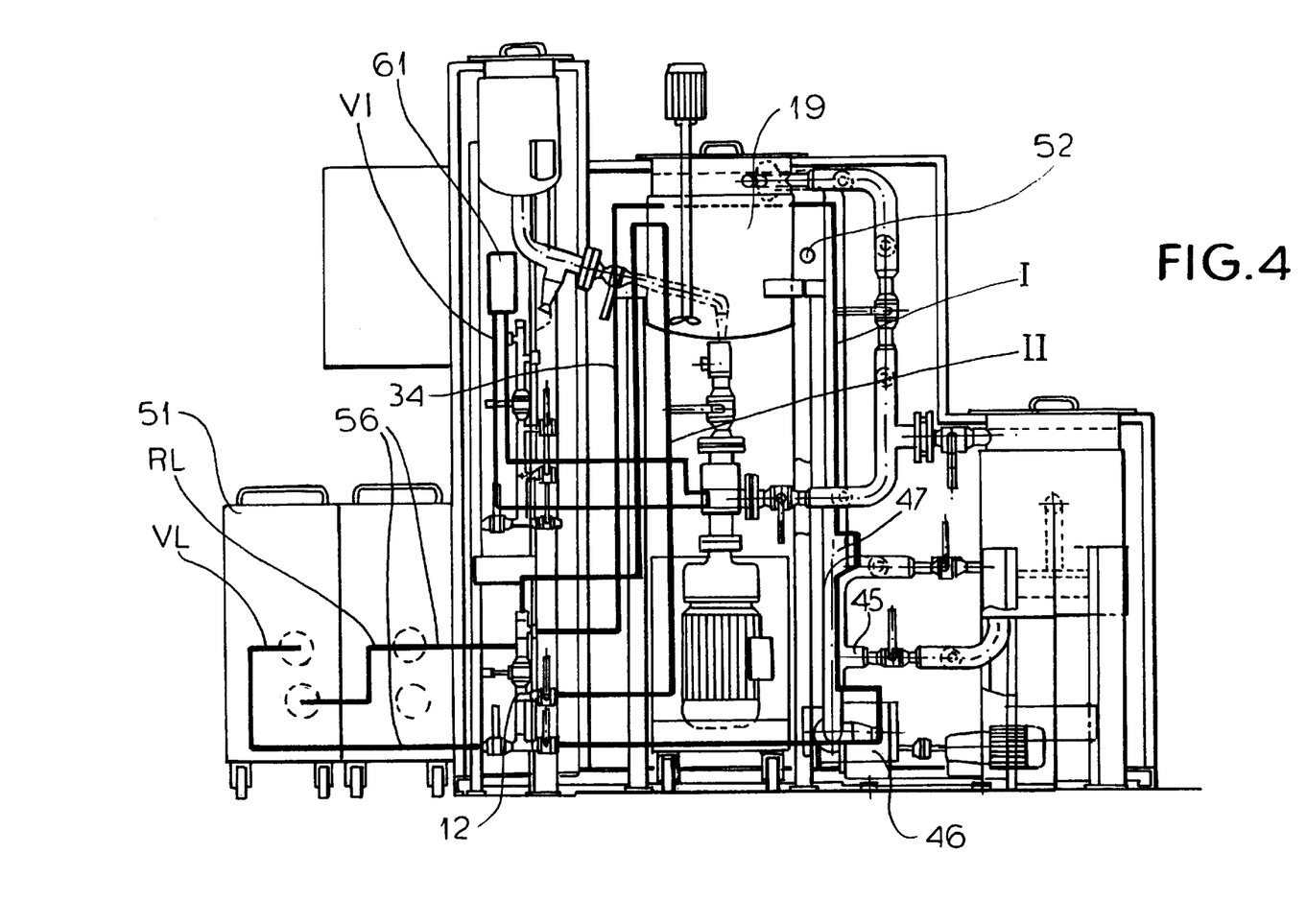
FIGS. 4 and 5 are diagrams of the heating/cooling circuit of the individual process steps.
Figure 5:
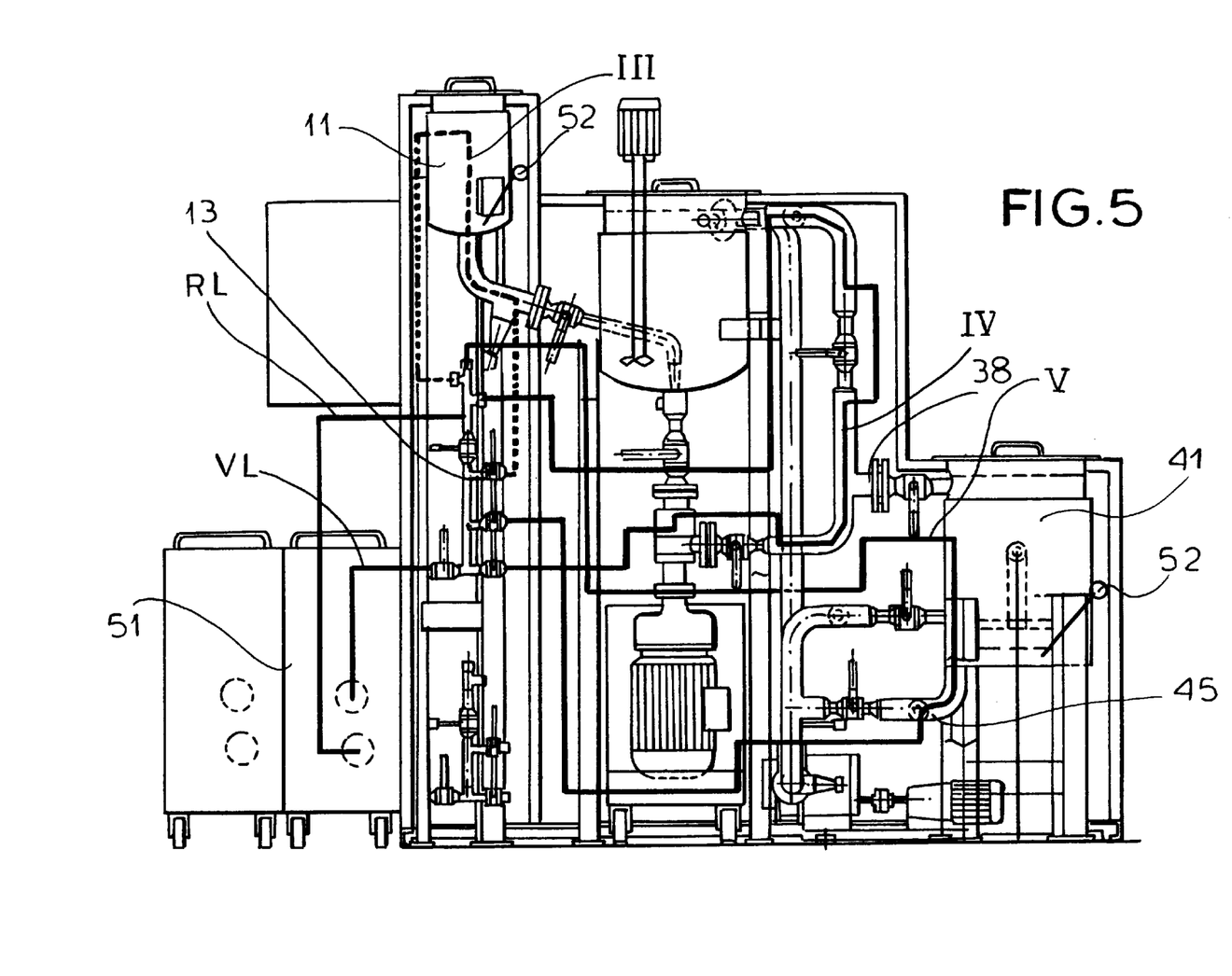

FIGS. 4 and 5 show the heating/cooling circuits for the containers and pipe conduits. All containers and pipe conduits are double-wall bodies made of stainless steel, for instance V2A. The spaces 50 between the outer wall and inner wall of the double-wall bodies are acted upon with a commercially available heat carrier oil, which guarantees a temperature in use of 300° C. From the tempering device 51 flexible metal hoses 56 as flow and return lines VL and RL, to the heat distributor 12, which by means of equally flexible metal hoses 56 forms heating/cooling circuits I and II. The heating/cooling circuit I leads from the flow line VL of the heat distributor 12 via the rotary piston pump 46, the ascending pipe 47 and the outlet conduit 44 to the return line of the heat distributor 12. The heating/cooling circuit II supplies exclusively the dispersion container 19. The separate cooling circuit VI cools slidable ring seals (not shown) in the shearing device 23. From a cooling-medium container 61 provided with a pump cooling fluid is sent according to the siphon principle via the supply line 59 to the shearing device 23 and returned to the cooling-medium container 61 via drain 60.

The other heat distributor 13 is connected with the tempering device 51 via flexible metal hoses 56. From the heat distributor 13 run the heating/cooling circuits III, IV and V., In the heating/cooling circuit III the melt container 11 and the drain-off pipe 15 are integrated, in the heating/cooling circuit IV the shearing device 23 and the recirculation conduit 27, in the heating/cooling circuit V the sedimentation container 41 with the branched-off pipe 38 and the branched-off pipe 45. Flexible metal hoses form here also the corresponding supply lines.

Figure 6:
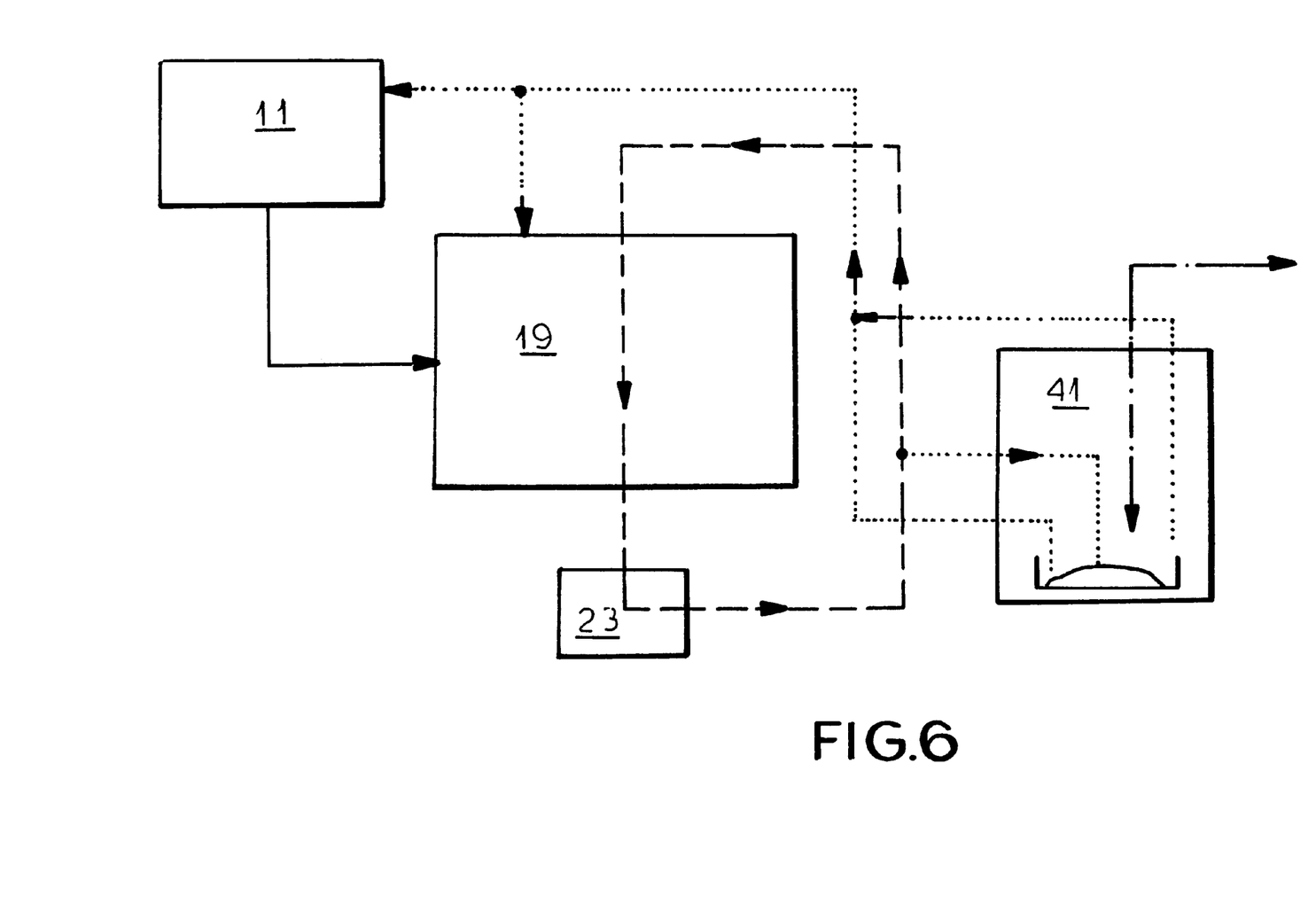
FIG. 6 is a diagram of the method of the invention.

FIG. 6 represents the flow of the process according to the invention. In the melt container 11 a mass of solder, for instance 10 kg of a Sn63Pb37 alloy, is introduced together with castor oil. The solder is completely covered by the oil and melted. The work temperature is kept at approximately 60° C. above the liquidus temperature by means of the heating/cooling circuit II.

In the melt container 11 a temperature sensor 52 is mounted for the precise temperature adjustment. This measured value serves for the control of the heating/cooling circuit.

After the massive solder has been melted, the ball valve 17 is opened and the solder melt flows together with the oil into the dispersion container 19, whose dimensions are selected so that the ratio is one part solder melt to ten parts oil. The solder melt sinks to the bottom area of the dispersion container 19 and, when the ball valve 21 is open, reaches the shearing device 23 via outlet pipe 20 and the inlet 53. Thereby the solder melt flows axially towards the first shearing step S1, wherein the melt is caught by the rotor 31 of the shearing device and separated.

The rotor 31 rotates with the drive shaft 33 of the shearing device 23, which is driven by the drive aggregate 29. The solder melt is radially diverted through the crenelated slots 34 of the rotor 31 and forced into the crenelated slots 35 of the stator 32, when the slots 34 in the rotor 31 and the slots 35 in the stator 32 come to coincide, clearing an outlet opening. During the passage of the of the slot 34 the melt flow is being sheared. Melt droplets result. After completing the first shearing step S1, the melt/oil mixture reaches the second shearing step S2, where again an axial feeding and a radial deflection of the solder/oil mixture take place, before the third shearing stage S3 is traversed.

Depending on the width and geometry of the slots at the periphery of the rotor 31 and the stator 32, as well as on the rotational speed, it is possible to set the desired particle size of the separated solder melt particles.

After the separation of the solder melt in the shearing steps S1, S2 and S3, the solder/oil mixture reaches the recirculation conduit 27 opened by means of ball valve 55, while the ball valve 40 of the branched-off pipe 38 is closed.

The solder/oil mixture is passed at least 20 times through the dispersion container 19 and the three-stage shearing device 23. This insures the desired particle size in a narrow grain size range, so that particle sizes of 1 to 100 $\mu$m can be set. If particle sizes of for instance 6 $\mu$m are desired, then with the method of the invention this size can be achieved without subsequent sorting.

A solder/oil dispersed phase results. The suction power of the shearing steps is sufficient for performing the recirculation without additional conveying aggregates. The ball valve 37 is closed and by opening the ball valve 40, the solder/oil dispersed phase is guided through the branched-off pipe 38 into the sedimentation container. The solder/oil dispersed phase flows into the sedimentation container 41, due to gravity the solder particles sink into the collection basket 43 of the insert 42, thereby being separated from the excess oil, whereby the solder particles remain enveloped by oil. After closing the ball valve 40 and opening the ball valves 48, respectively 49, the oil is returned to the dispersion container 19 via the rotary piston pump 46 and the ascending pipe 47.

Naturally the removal of the solder particles from the sedimentation container 41 can also be done so that, after the solder particles have sunk, the excess oil is aspired as previously described and returned to the dispersion container 19. The ball valve 49 is closed. Through the dip pipe 63 a fat dissolving solvent, for instance acetone, is introduced into the sedimentation container 41 by means of a pump with variable direction of rotation, not shown in the drawing. The solvent and the solder particles are then agitated by an agitator 64 until a suspension which can be pumped is formed. After the rotation direction of the pump is reversed, the suspension is sucked out of the sedimentation container 41 and sent to a cleaning installation not shown in the drawing.

Through the heating circuit V in the sedimentation container 41 a temperature of about 100° C. is set, in order to correspondingly cool down the solder particles prior to removal. When the collection basket 43 is retrieved, the ball valves 40, 48 and 49 are closed.

After the collection basket 43 is reinserted, the ball valve 40 of the branched-off pipe 38 remains closed and the ball valve 37 of the recirculation conduit 27 is opened, so that the aforedescribed process can be repeated.

With the heating/cooling circuits I to IV, a process be.temperature of about 60° C. above the liquidus temperature of the solder is maintained in the containers 11 and 19, the pipe conduits 15, 18, 27, 38, 44, 45, the ball valves 17, 21, 37, 40, 48 and 49, as well as in the shearing device 23.

The soft solders produced with the method of the invention have a narrow grain size range up to 100 $\mu$m, whereby sorting is completely eliminated. By selecting the number, shape of the slots in the shearing device as well as the speed of the rotors and the number of recirculations, it is possible also to set an exact grain size of less than 100 $\mu$m.

We claim:

1. An apparatus for the production of soft solder powder in a particle size range of 1 to 100 $\mu$m and a liquidus temperature <250° C., comprising:
    a support;
    a melt container on said support for holding a solder melt;
    a dispersion container on said support below said melt container and receiving an oil in which said solder melt is dispersable;
    a melt pipe connecting said melt container with said dispersion container and extending downwardly with an inclination to a deepest point of said dispersion container;
    a multistage shearing device on said support having an inlet connected to said dispersion container at said deepest point and an outlet, said multistage shearing device subdividing said solder melt into melt droplets dispersable in said oil;
    a recirculation pipe connecting said outlet with an upper part of the dispersion container;
    a sedimentation container on said support below said dispersion container;
    a branch pipe from said recirculation pipe opening into said sedimentation container, said sedimentation container having outlet pipes;
    an ascending pipe communicating with the upper part of the sedimentation container and provided with a pump connected to said outlet pipes; and
    at least one heating device for heating said containers, said pipes, said pump and said multistage shearing device.

2. The apparatus defined in claim 1 wherein said pipes and said containers are double walled bodies with spaces between inner and outer walls supplied with a high temperature heat carrier oil by said heating device.

3. The apparatus defined in claim 1 wherein said dispersion container forms part of a first heating and cooling circuit, said pump, said ascending pipe and one of said outlet pipes are integrated in a second heating and cooling circuit, said melt container and said melt pipe are integrated in a third heating and cooling circuit, said shearing device and said recirculation device are integrated in a fourth heating and cooling circuit and said sedimentation container and said branch pipe and the other of said outlet pipes are integrated in a fifth heating and cooling circuit, said heating and cooling circuits being connected by flexible metal hoses to a common distributor.

4. The apparatus defined in claim 1 wherein said containers, said pipes and said shearing devices are integrated into a single heating and cooling circuit.

5. The apparatus defined in claim 1 wherein said containers, said pipes and said shearing devices are electrically heated by heating cuffs.

6. The apparatus defined in claim 1 wherein said pipes are provided with ball valves.

7. The apparatus defined in claim 1 wherein said shearing device comprises a plurality of rotors arranged in succession on a drive shaft and rotating therewith, said rotors having teeth spaced apart by slots and set in a stator secured against rotation and also having teeth spaced apart by slots, the slots in said rotors and stators forming passages for a solder/oil mixture between shearing stages.

8. The apparatus defined in claim 7 wherein the teeth of each rotor and said stator form tooth circles arranged concentrically with respect to one another and interfitted.

9. The apparatus defined in claim 8 wherein the shearing device is disposed vertically in alignment with an axis of dispersion container and has an inlet along said axis.

10. The apparatus defined in claim 1, further comprising an agitator in said dispersion container.

11. The apparatus defined in claim 1 wherein said sedimentation container includes an insert with a collection basket arranged therein.

12. The apparatus defined in claim 1 wherein said collection basket has adjustable outlet openings at a lateral periphery thereof.

13. The apparatus defined in claim 1 wherein a dip pipe passes through a container cover of said sedimentation container and has one end close to a bottom of said sedimentation container and another end connected with a pump with a variable direction of rotation.

14. The apparatus defined in claim 1 wherein said pipes are provided with temperature sensors for measuring temperature of the solder.

15. The apparatus defined in claim 1 wherein said support comprises a housing frame with a bottom plate and support stands for receiving said containers, said pipes and said pump and distributors for said heating device.

16. The apparatus defined in claim 15 wherein said shearing device is received by an insert movable on said bottom plate.

17. The apparatus defined in claim 15 wherein said frame is provided with wall plates with inner sides having heat and sound insulation coated with aluminum foil.

18. The apparatus defined in claim 1 wherein said containers, said pipes and said pump are thermally insulated.

19. The apparatus defined in claim 1 wherein said heating device is movable and is disposed outside said support.

* * * * *